US012649474B2

(12) United States Patent
Askari et al.

(10) Patent No.: US 12,649,474 B2
(45) Date of Patent: Jun. 9, 2026

(54) METHOD AND ARCHITECTURE FOR POWERHOP IDENTIFICATION AND MITIGATION

(71) Applicant: GM Global Technology Operations LLC, Detroit, MI (US)

(72) Inventors: Hassan Askari, Thornhill (CA); Mustafa Hakan Turhan, Kitchener (CA); Saurabh Kapoor, Windsor (CA); SeyedAlireza Kasaiezadeh Mahabadi, Novi, MI (US); Nauman Sohani, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 401 days.

(21) Appl. No.: 18/466,320

(22) Filed: Sep. 13, 2023

(65) Prior Publication Data

US 2025/0083518 A1 Mar. 13, 2025

(51) Int. Cl.
*B60W 30/20* (2006.01)
*B60K 28/16* (2006.01)
(52) U.S. Cl.
CPC ............. *B60W 30/20* (2013.01); *B60K 28/16* (2013.01)
(58) Field of Classification Search
CPC .. B60W 30/20; B60W 30/18; B60W 2520/28; B60W 2710/0666; B60W 2720/30; B60K 28/16
See application file for complete search history.

(56) References Cited

U.S. PATENT DOCUMENTS

| | | | |
|---|---|---|---|
| 6,401,853 B1 | 6/2002 | Turski et al. | |
| 2003/0065435 A1* | 4/2003 | Krueger | B60T 8/48 |
| | | | 180/197 |
| 2008/0243334 A1 | 10/2008 | Bujak et al. | |
| 2008/0319623 A1 | 12/2008 | Dobkin et al. | |
| 2011/0172889 A1* | 7/2011 | Zhang | B60W 30/20 |
| | | | 701/54 |
| 2015/0112540 A1* | 4/2015 | Rutkowski | G07C 5/006 |
| | | | 701/29.4 |
| 2016/0159187 A1* | 6/2016 | Mohamed | B60G 17/08 |
| | | | 701/37 |
| 2019/0092258 A1* | 3/2019 | Salter | G07C 5/008 |
| 2019/0225226 A1* | 7/2019 | Kang | B60W 10/184 |
| 2022/0324421 A1* | 10/2022 | Giovanardi | G08G 1/0145 |
| 2024/0034323 A1* | 2/2024 | Robson | B60W 30/18172 |

FOREIGN PATENT DOCUMENTS

| | | |
|---|---|---|
| DE | 19601529 A1 | 7/1997 |
| DE | 102006007753 A1 | 10/2006 |
| DE | 102010032045 A1 | 8/2011 |

* cited by examiner

*Primary Examiner* — George C Jin
(74) *Attorney, Agent, or Firm* — Vivacqua Crane, PLLC

(57) ABSTRACT

A method for powerhop identification and mitigation includes receiving sensor data of a vehicle, such as wheel speed; determining a wheel jerk characteristics of the vehicle based on the wheel speed; determining a ride height of the vehicle; determining whether the vehicle is experiencing powerhop based on the wheel jerk characteristics and the ride height of the vehicle; and in response to determining that the vehicle is experiencing powerhop, adjusting a torque of the vehicle to mitigate the powerhop.

18 Claims, 5 Drawing Sheets

700

METHOD AND ARCHITECTURE FOR POWERHOP IDENTIFICATION AND MITIGATION

INTRODUCTION

The present disclosure relates to an architecture and method for powerhop identification and mitigation.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Powerhop, also known as wheel hop, is a detrimental phenomenon that occurs in vehicle dynamics, especially in high-performance cars where excessive torque is transmitted to the wheels, resulting in a sudden and rapid vertical movement of the tires and suspension system, leading to a loss of traction and stability. When it comes to passenger safety and ride comfort in vehicles, it is desirable to identify and address powerhop in real-time.

SUMMARY

The present disclosure describes a system and method for identifying and mitigating powerhop in real-time to enhance the overall driving experience, ensuring a comfortable ride in the vehicle. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for powerhop identification and mitigation. The method also includes receiving sensor data of a vehicle, where the sensor data includes wheel speed; determining a wheel jerk characteristics of the vehicle based on the wheel speed; determining a ride height of the vehicle; determining whether the vehicle is experiencing powerhop based on the wheel jerk characteristics and the ride height of the vehicle; and in response to determining that the vehicle is experiencing powerhop, adjusting a torque of the vehicle to mitigate the powerhop. Other embodiments of this aspect include corresponding computer systems, apparatus, and computer programs recorded on one or more computer storage devices, each configured to perform the actions of the methods.

Implementations may include one or more of the following features. The method where the wheel jerk characteristics include a wheel jerk amplitude and a wheel jerk duration, where the wheel jerk amplitude is a second derivate of the wheel speed with respect to time. The method may include determining whether an absolute value of a change in the wheel jerk amplitude within a predetermined amount of time is greater than a predetermined amplitude threshold, and in response to determining that the absolute value of the change in the wheel jerk amplitude within the predetermined amount of time is greater than the predetermined amplitude threshold, setting a wheel speed flag to on. The method may include determining whether a change in the ride height of the vehicle within the predetermined amount of time is less than a predetermined ride height threshold, and in response to determining that the change in the ride height of the vehicle within the predetermined amount of time is less than the predetermined ride height threshold, setting a ride height flag to on. The method may include determining whether an anti-lock braking system (ABS) of the vehicle is inactive. The method may include determining whether a derivative of a throttle position with respect to time is equal or greater than zero. The method may include determining that the abs of the vehicle is inactive, determining that the derivative of the throttle position with respect to time is equal or greater than zero, determining that the wheel speed flag is set to on, determining that the ride height flag is set to on; setting a powerhop flag to on in response to: (a) determining that the abs of the vehicle is inactive; (b) determining that the derivative of the throttle position with respect to time is equal or greater than zero; (c) determining that the wheel speed flag is set to on; and (d) determining that the ride height flag is set to on. The torque of the vehicle is adjusted to mitigate the powerhop in response to setting the powerhop flag to on. Implementations of the described techniques may include hardware, a method or process, or computer software on a computer-accessible medium.

The present disclosure also describes a vehicle including sensors and a controller in communication with the sensors. The sensors may include one or more wheel speed sensors and one or more ride height sensors. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
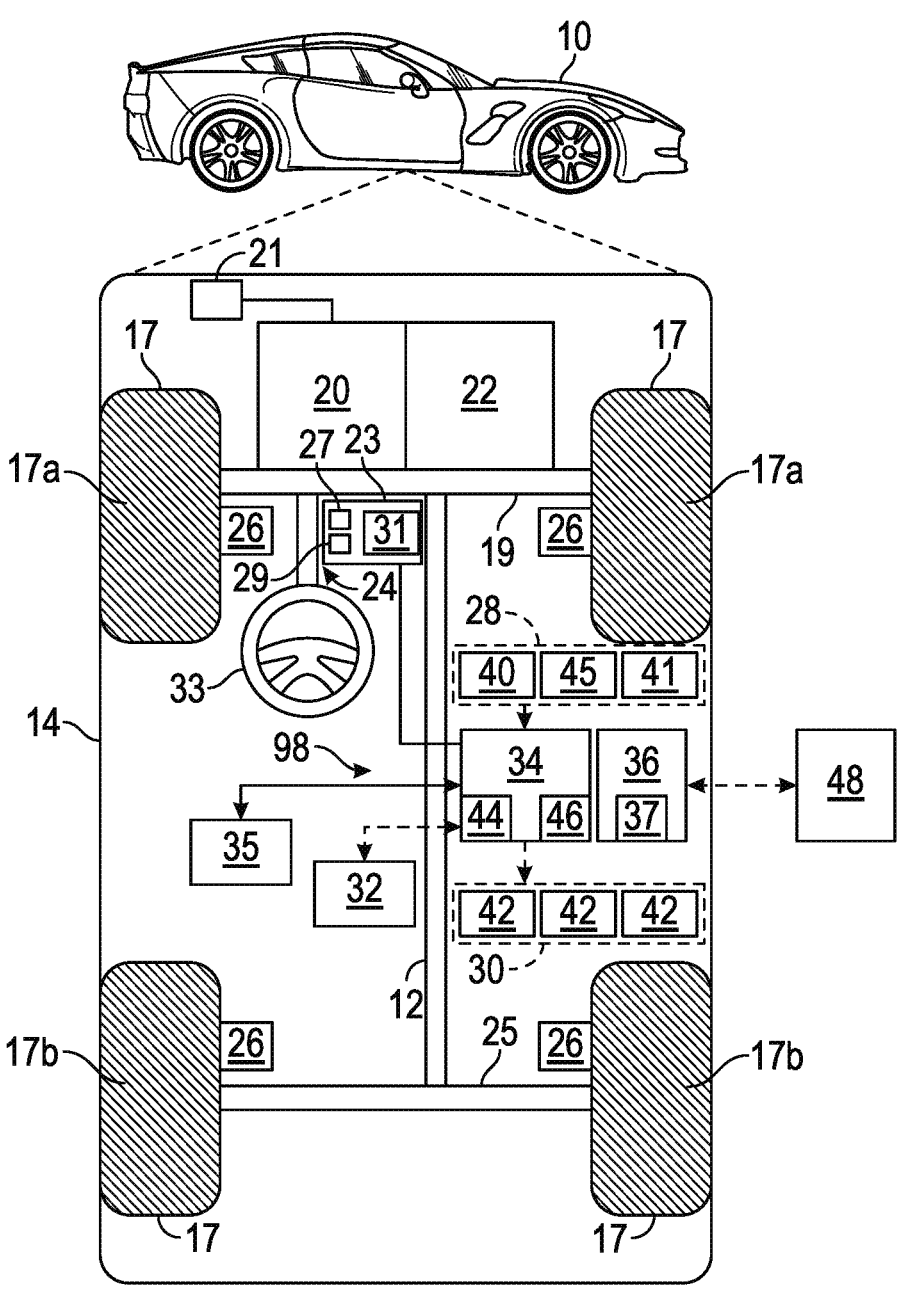
FIG. 1 is a block diagram depicting an embodiment of a vehicle.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a chassis 12, a body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

The vehicle 10 is an autonomous vehicle, and a control system 98 is incorporated into the vehicle 10. The system 98 may be referred to as the system or the system for controlling the steering system 24. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may include a so-called a Level Two, a Level Three, Level Four, or Level Five driving automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the system 98 performs the entire dynamic driving task (DDT) within the area that it is designed to do so. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, an Anti-lock Braking System (ABS) 26, a sensor system 28, an actuator system 30, at least one data storage device 32, at least one controller 34, and a communication system 36. The steering system 24 is a steer-by-wire system. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The ABS 26 is configured to provide braking torque to the vehicle wheels 17. The ABS 26 may, in various embodiments, include friction brakes, brake by wire, a regenerative braking system such as an electric machine, and/or other appropriate braking systems. The steering system 24 influences the position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more steering wheel sensors 45, one or more radars, one or more light detection and ranging (lidar) sensors, one or more proximity sensors, one or more wheel speed sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more throttle position sensors, one or more cameras 41 (e.g., eye tracker), one or more gyroscopes, one or more accelerometers, one or more inclinometers, one or more speed sensors, one or more ultrasonic sensors, one or more inertial measurement units (IMUs), one or more night-vision devices, thermal imaging sensors, and/or other sensors. Each sensor 40 is configured to generate a signal that is indicative of the sensed observable conditions of the exterior environment and/or the interior environment of the vehicle 10. Because the sensor system 28 provides data to the controller 34, the sensor system 28 and its sensors 40 are considered sources of information (or simply sources). The vehicle 10 and/or system 98 does not include light sensors capable of detecting light inside the vehicle 10.

The actuator system 30 includes one or more actuator 42 that control one or more vehicle features such as, but not limited to, the propulsion system 20, the transmission system 22, the steering system 24, and the ABS 26. In various embodiments, the vehicle features may further include interior and/or exterior vehicle features such as, but are not limited to, doors, a trunk, and cabin features such as air, music, lighting, etc. The actuator 42 may include a throttle.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute a method 200 (FIG. 2) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the control system 98.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The user interface 23 is in electronic communication with the controller 34 and is configured to receive inputs by a vehicle occupant 11 (e.g., a vehicle driver or a vehicle passenger). For example, the user interface 23 may include a touch screen and/or buttons configured to receive inputs from a vehicle occupant 11. Accordingly, the controller 34 is configured to receive inputs from the user via the user interface 23. The vehicle 10 may include one or more displays 29 configured to display information to the vehicle occupant 11 (e.g., vehicle operator or passenger) and may be a head-up display (HUD).

The communication system 36 is in communication with the controller 34 and is configured to wirelessly communicate information to and from other remote vehicles 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote vehicle" means a vehicle, such as a car, configured to transmit one or more signals to the vehicle 10 while not physically connected to the vehicle 10. In certain embodiments, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

Figure 2:
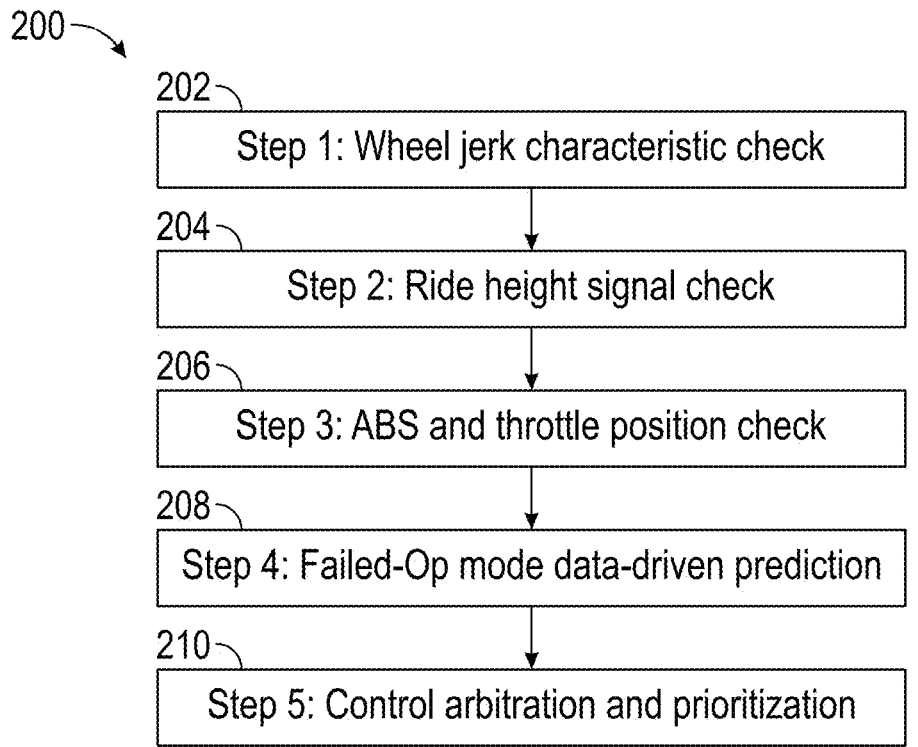
FIG. 2 is a flowchart of a method for identifying and mitigating powerhop.

FIG. 2 is a flowchart of a method 200 for identifying and mitigating powerhop. The method 200 detects and mitigates powerhop. Powerhop, which is also known as wheel hop, is an oscillating phenomenon that typically occurs in high-performance vehicles during hard acceleration. Powerhop can may negatively affect the driveline system. In addition to accurately detecting power hop, the method 200 implements an effective mitigation strategy. Depending on the sensory set available within the vehicle, the method 200 identifies powerhop based on the wheel speed jerk characteristics, wheel-to-body relative motion (i.e., ride height motion), throttle position variation, and ABS interaction. The method 100 also includes a data-driven methodology using IMU sensor information to identify powerhop when both the wheel speed and ride height sensors are unavailable. Once powerhop is identified, a speed-dependent control strategy is proposed to mitigate the severity of the event. The prioritization and arbitration of control actions are also considered.

With continued reference to FIG. 2, the method 200 begins at block 202. Block 202 entails receiving sensor data from the sensors 40, such as the wheel speed sensors, the IMU, and the ride height sensors. Therefore, the sensor data may include the wheel speed, the ride height, and the lateral and/or longitudinal acceleration of the vehicle 10. At block 202, the controller determines the wheel jerk characteristics of the vehicle 10 based on the wheel speed. The wheel jerk characteristics include the amplitude of the wheel jerk and the duration of the wheel jerk.

Figure 3:
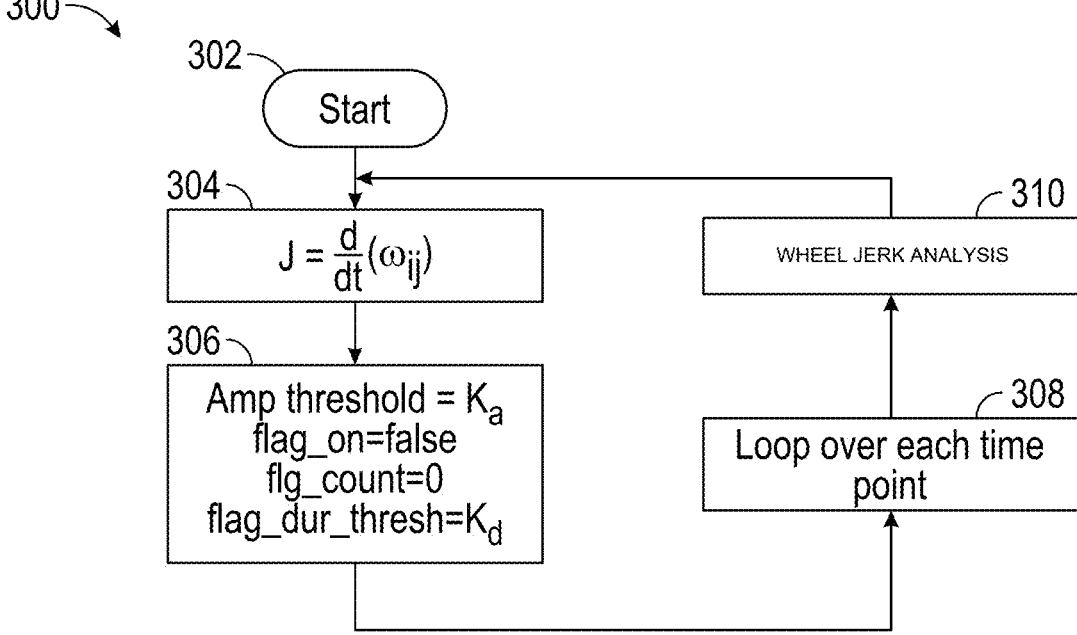
FIG. 3 is a flowchart of a method for determining wheel jerk characteristics.

FIG. 3 is a flowchart of a method 300 for executing at least part of block 202. The method 300 begins at block 302. Then, the method 300 proceeds to block 304. At block 304, the controller 34 determines and continuously monitors the amplitude of the wheel jerk at predetermined time intervals. Each time interval spans a predetermined amount of time. The controller 34 calculates the second derivative of the wheel speed of the driven wheels 17 with respect to time to determine the amplitude of the wheel jerk. Then, the method 300 continues to block 306. At block 306, the controller 34 retrieves the initial parameters. The initial parameters are the predetermined amplitude threshold, the wheel speed flag set to off, the wheel speed count set to zero, and the predetermined wheel jerk duration threshold. Then, the method 300 then proceeds to block 308. Block 308 entails looping over the wheel jerk and assessing several predefined calibratable thresholds to identify the start and end of a powerhop event. Then, the method 100 continues to block 308. Block 310 entails an analysis of the wheel jerk characteristics as described below. After block 310, the method 300 returns to block 304.

Figure 4:
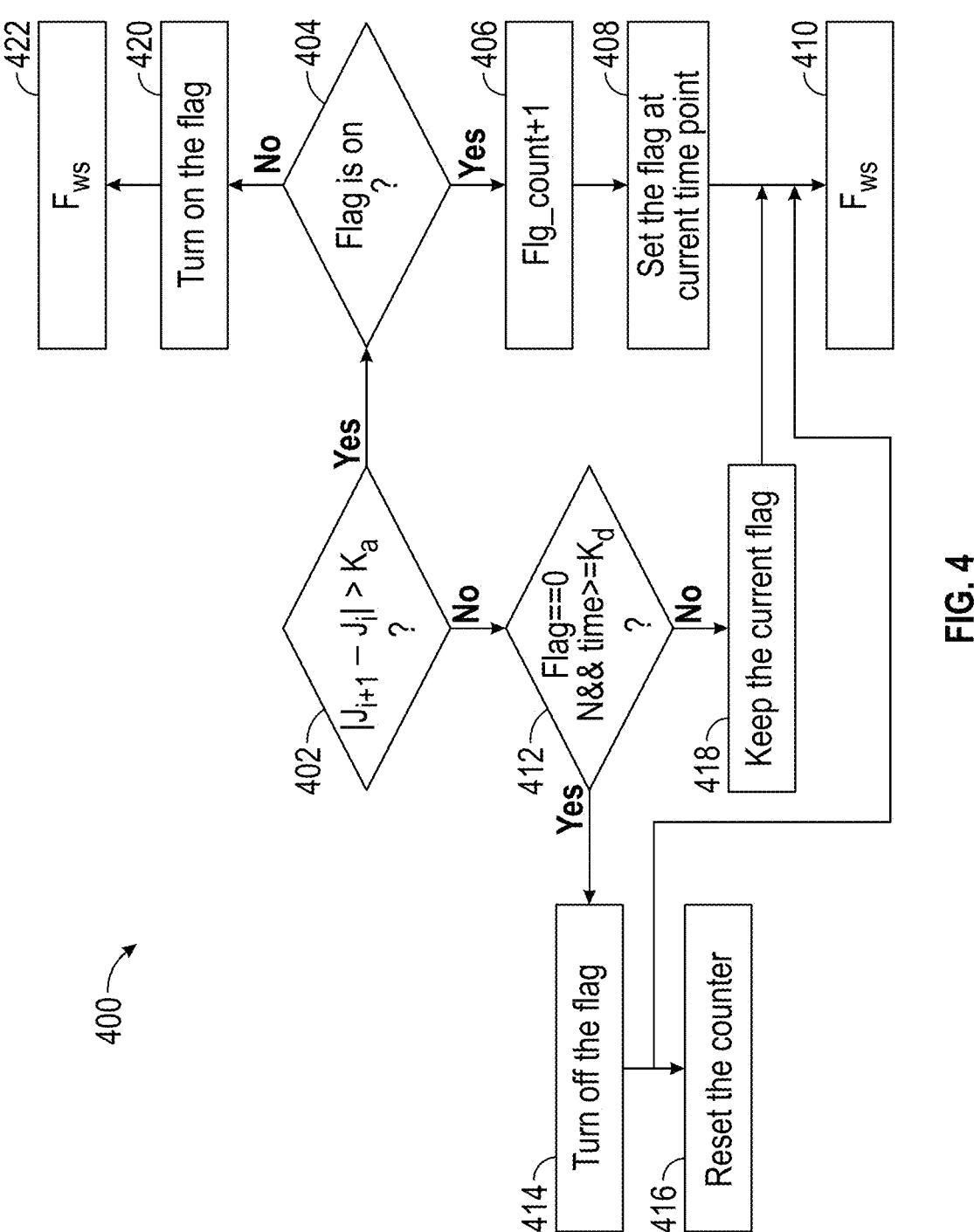
FIG. 4 is a flowchart for a method for determining whether the status of the wheel speed flag.

FIG. 4 is a method 400 for analyzing the wheel jerk characteristics, which is executed at block 310 of the method 300. The method 400 begins at block 402. Block 402 entails determining the absolute value of a change in the wheel jerk amplitude within a predetermined amount of time. Further, at block 402, the controller determines whether the absolute value of a change in the wheel jerk amplitude within the predetermined amount of time is greater than the predetermined amplitude threshold. If the absolute value of a change in the wheel jerk amplitude within the predetermined amount of time is greater than the predetermined amplitude threshold is greater than the predetermined amplitude threshold, the method 400 proceeds to block 404. At block 404, the controller 34 determines the wheel speed flag is set to on. If the wheel speed flag is set to on, then the method 400 continues to block 406. At block 406, and the flag counter is incremented by one. Then, the method 400 continues to block 408. At block 408, the controller 34 sets the wheel speed flag to on at the current time point. Then, the method 400 continues to block 410. At block 410, the controller 34 outputs the that the wheel speed flag is set to on.

If it is determined at block 402 that the absolute value of the change in the wheel jerk amplitude within the predetermined amount of time is not greater than the predetermined amplitude threshold, then the method 400 continues to block 412. At block 412, the controller 34 determines whether the wheel speed flag is set to on, and the predetermined time threshold has elapsed. If the wheel speed flag is set to on and the wheel jerk duration threshold has elapsed, then the method 400 proceeds to block 414. At block 414, the controller 34 sets the wheel speed flag to off. Then, the method 400 continues to block 416, the controller 34 resets the counter.

If it is determined at block 412 that either the wheel speed flag is set to off or the predetermined time threshold has elapsed, then the method 400 continues to block 418. At block 418, the wheel speed flag remains in its on state. After block 418, the method 400 proceeds to block 410.

If it is determined at block 404 that the wheel speed flag is in off status, then the method 400 continues to block 420. At block 420, the wheel speed flag is set to on. Then, the method 400 continues to block 422. At block 422, the controller 34 outputs the that the wheel speed flag is set to on.

With reference again to FIG. 2, after executing block 202, the method 200 proceeds to block 204. At block 204, the controller 34 analyzes the ride height of the vehicle 10 and determines whether ride height flag should be set to on or off.

Figure 5:
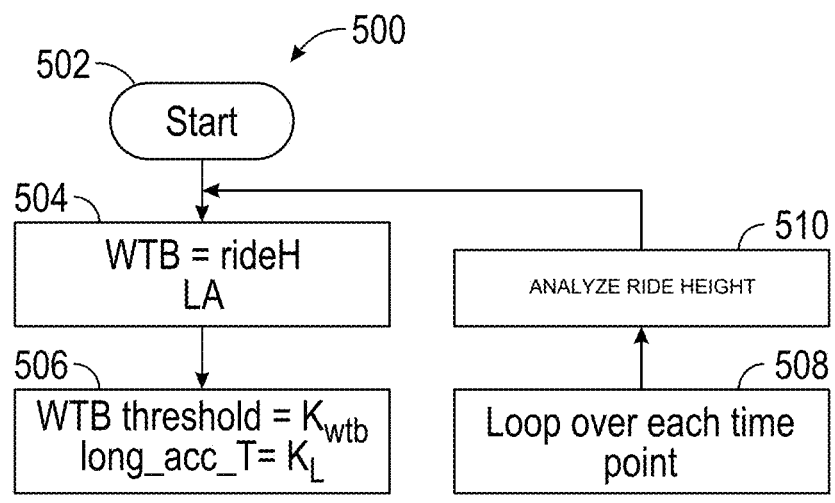
FIG. 5 is a flowchart of a method for determining ride height.

FIG. 5 is a method 500 for analyzing the ride height of the vehicle 10 as discussed above with respect to block 204. The method 500 begins at block 502. Then, the method 500 continues to block 504. At block 504, the controller 34 determines the ride height of the vehicle 10 at different time intervals using the sensor data from the ride height sensors. Each time interval spans the predetermined amount of time. Also, at block 504, the controller 34 determines the longitudinal acceleration of the vehicle 10 at different time intervals using, for example, the sensor data from the IMU. Then, the method 500 continues to block 506. At block 506, the controller 34 retrieves the initial parameters. The initial parameters include a predetermined ride height threshold and a longitudinal acceleration threshold. Then, the method 500 continues to block 508. Block 508 entails looping over the ride height and assessing several predefined calibratable thresholds at each time point. Then, the method 500 continues to block 510. At block 510, the controller 34 analysis the ride height to determine whether the ride height flag should be set to on or off as described below. Then, the method 500 returns to block 504.

Figure 6:
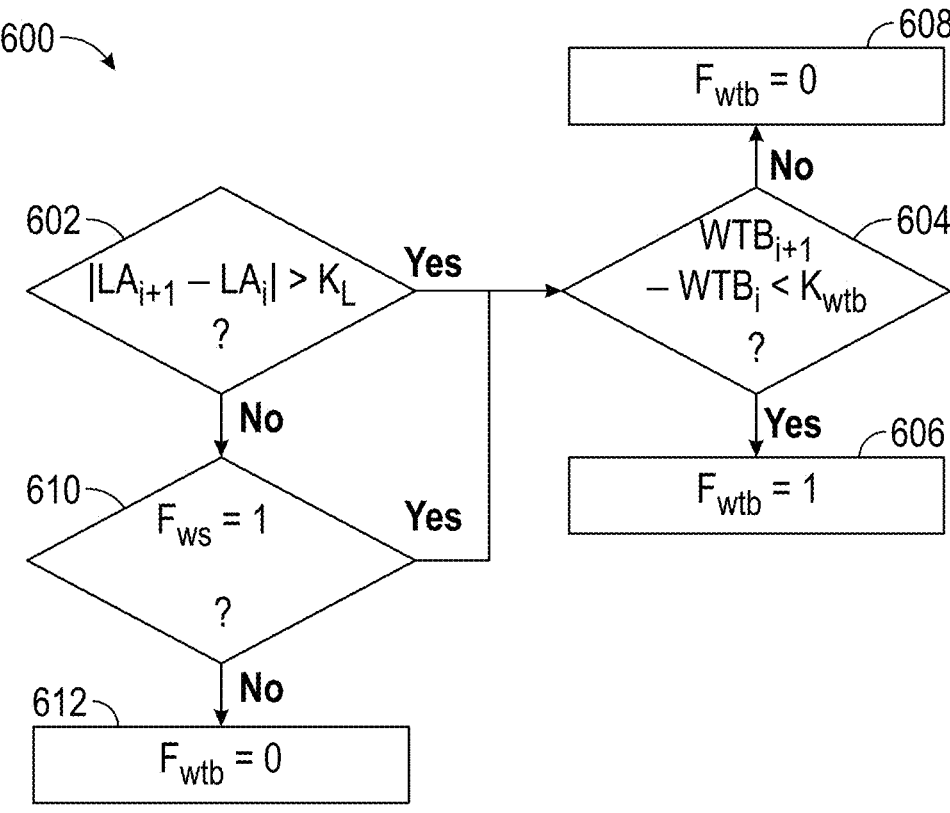
FIG. 6 is a flowchart of a method for determining the status of the ride height flag.

FIG. 6 is a method 600 for analyzing the ride height of the vehicle 10, which is executed at block 510 of the method 500. Th method 600 begins at block 602. Block 602 entails determining whether a change in the longitudinal acceleration of the vehicle 10 within the predetermined amount of time is greater than the predetermined acceleration threshold. If the change in the longitudinal acceleration of the vehicle 10 within the predetermined amount of time is greater than the predetermined acceleration threshold, then the method 600 proceeds to block 604. At block 604, the controller 34 determines whether a change in the ride height of the vehicle 10 within the predetermined amount of time is less than the predetermined ride height threshold. If the change in the ride height of the vehicle 10 within the predetermined amount of time is less than the predetermined ride height threshold, then the method 600 continues to block 606. At block 606, the ride height flag is set to on. If the change in the ride height of the vehicle 10 within the predetermined amount of time is not less than the predetermined ride height threshold, then the method 600 continues to block 608. At block 608, the ride height flag is set off.

If it is determined at block 602 that the change in the longitudinal acceleration of the vehicle 10 within the predetermined amount of time is not greater than the predetermined acceleration threshold, then the method 600 proceeds to block 610. At block 610, the controller 34 determines whether the wheel speed flag is set to on. If the wheel speed flag is set to on, then the method 600 continues to block 604. If the wheel speed flag is off, then the method 600 continues to block 612. At block 612, the ride height flag is set off.

With reference again to FIG. 2, after executing block 204, the method 200 continues to block 206. At block 206, the status of the ABS 26 and the throttle position are checked to determine whether the powerhop flag is set to on or off as discussed in detail below.

Figure 7:
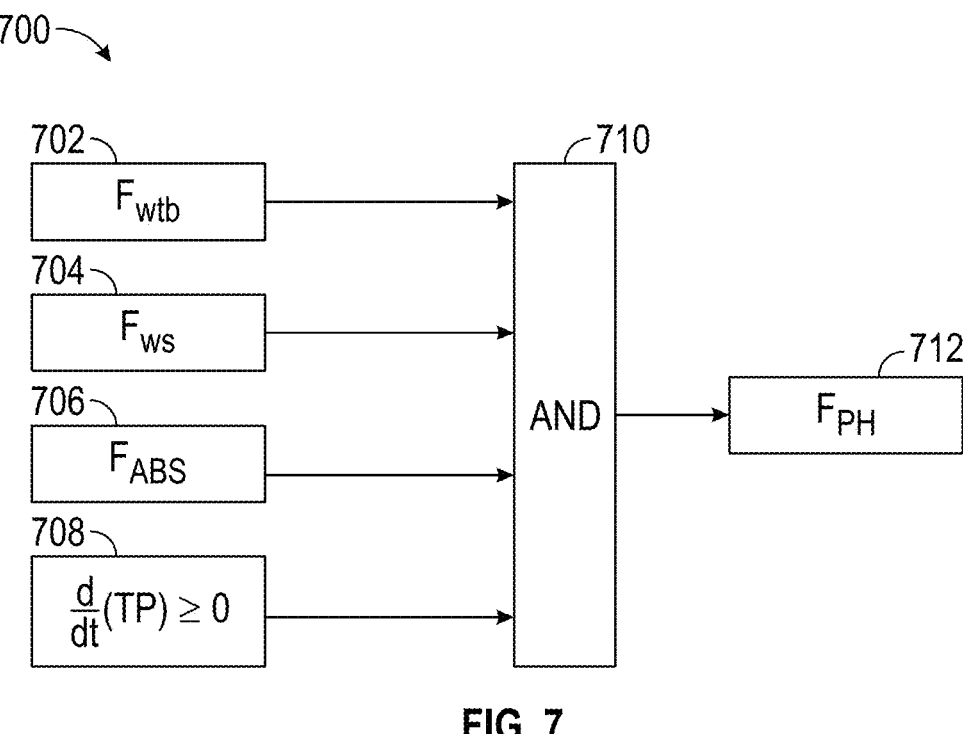
FIG. 7 is a flowchart for checking the status of the anti-lock braking system and the throttle position.

FIG. 7 is a flowchart of a method 700 for checking the status of the ABS 26 and the throttle position. The method 700 begins at blocks 702, 704, 706, and 708. Block 702 entails whether the ride height flag is on. If the ride height sensors are not available, the ride height flag is set to on. Block 704 entails determining whether the wheel speed flag is set to on. Block 706 entails determining whether the status of the ABS 26 is inactive. At block 708, the controller 34 determines whether the derivative of the throttle position with respect to time is equal or greater than zero. At block 710, the controller 34 determines whether the ride height flag is on, the wheel speed flag is set to on, the ABS 26 is inactive, and the derivative of the throttle position with respect to time is equal or greater than zero. If the ride height flag is on, the wheel speed flag is set to on, the ABS 26 is inactive, and the derivative of the throttle position with respect to time is equal or greater than zero, then the method 700 continues to block 712. At block 712, the controller 34 sets the powerhop flag to on.

With reference again to FIG. 2, after executing block 206, the method 200 continues to block 208. At block 208, the controller 34 uses a machine learning process to determine that the vehicle is experiencing powerhop using sensor data from the at least one IMU if the wheel speed sensors and the ride height sensors are unavailable (i.e., have failed). The machine learning algorithm may be developed by utilizing labeled powerhop data. The machine learning algorithm enables real-time identification of powerhop incidents in the event that both the wheel speed sensors and the ride height sensors are concurrently unavailable. The learning method for the machine learning algorithm may entail receiving relevant inputs, labeling the powerhop incidents, training the machine learning algorithm, feature selection, cross validation, outputting results, and comparing the results of the data driven method (i.e., machine learning algorithm) with the deterministic algorithm (i.e., method 200). As discussed above, the data driven method (i.e., machine learning algorithm) is activated if both the wheel speed sensors and the ride height sensors are concurrently unavailable. Further, the data driven method (i.e., machine learning algorithm) uses sensor data from one or more IMUs to determine whether a powerhop event has occurred. The data driven method (i.e., machine learning algorithm) may use the primary axle torque, the tire temperature, the longitudinal acceleration, the lateral acceleration, and the throttle position to determine whether a powerhop event has occurred.

After executing block 208, the method 200 continues to block 210. At block 210, the controller 34 arbitrates between torque to mitigate the powerhop and drivetrain limits. The highest arbitration priority is given to the powerhop control, and it has the strictest limits. However, reducing clutch torque may lead to reduced vehicle acceleration especially in split friction acceleration events. Hence, the torque target arbitration considers an optimal balance between magnitude of powerhop and the allowed wheel slip across the left and right wheels 17. At block 210, the controller 34 determines the torque adjust necessary for powerhop mitigation (i.e., the powerhop target torque) based on the wheel speed. In one situation, the controller 34 may solely consider the powerhop target torque and adjusts the torque of the vehicle 10 according to mitigate the powerhop. Additional torque due to yaw error and wheel control clutch target may be considered. In other situations when the powerhop occurs and the wheel control is active, the controller 34 considers the powerhop target torque plus the torque vector from other sources (e.g., steady state and transient targets). If the powerhop control is disable, the controller 34 may consider torque vector from other sources and not the powerhop target torque. In all situations, additional torque due to yaw error and wheel control clutch target may be considered.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for powerhop identification and mitigation, comprising:

receiving sensor data of a vehicle, where the sensor data includes wheel speed;

determining a wheel jerk characteristics of the vehicle based on the wheel speed;

determining a ride height of the vehicle;

determining whether the vehicle is experiencing power-hop based on the wheel jerk characteristics and the ride height of the vehicle; and in response to determining that the vehicle is experiencing powerhop, adjusting a torque of the vehicle to mitigate the powerhop, wherein the wheel jerk characteristics include a wheel jerk amplitude and a wheel jerk duration, wherein the wheel jerk amplitude is a second derivate of the wheel speed with respect to time.

2. The method of claim 1, further comprising:

determining whether an absolute value of a change in the wheel jerk amplitude within a predetermined amount of time is greater than a predetermined amplitude threshold; and in response to determining that the absolute value of the change in the wheel jerk amplitude within the predetermined amount of time is greater than the predetermined amplitude threshold, setting a wheel speed flag to on.

3. The method of claim 2, further comprising:

determining whether a change in the ride height of the vehicle within the predetermined amount of time is less than a predetermined ride height threshold; and in response to determining that the change in the ride height of the vehicle within the predetermined amount of time is less than the predetermined ride height threshold, setting a ride height flag to on.

4. The method of claim 3, further comprising determining whether an Anti-lock Braking System (ABS) of the vehicle is inactive.

5. The method of claim 4, further comprising determining whether a derivative of a throttle position with respect to time is equal or greater than zero.

6. The method of claim 5, further comprising:

determining that the ABS of the vehicle is inactive;

determining that the derivative of the throttle position with respect to time is equal or greater than zero;

determining that the wheel speed flag is set to on;

determining that the ride height flag is set to on;

setting a powerhop flag to on in response to: (a) determining that the ABS of the vehicle is inactive; (b) determining that the derivative of the throttle position with respect to time is equal or greater than zero; (c) determining that the wheel speed flag is set to on; and (d) determining that the ride height flag is set to on.

7. The method of claim 6, wherein the torque of the vehicle is adjusted to mitigate the powerhop in response to setting the powerhop flag to on.

8. The method of claim 1, wherein the vehicle includes a plurality of sensors, the plurality of sensors includes at least one wheel speed sensor, at least one ride height sensor, and at least one inertial measurement unit (IMU), the wheel speed is determined using the at least one wheel speed sensor of the vehicle, and the ride height is determined using the at least one ride height sensor of the vehicle, and the method further comprises:

determining that the at least one wheel speed sensor is unavailable;

determining that the least one ride height sensor is unavailable; and in response to determining that the at least one wheel speed sensor is unavailable and determining that the least one ride height sensor is unavailable, using a machine learning process to determine that the vehicle is experiencing powerhop using sensor data from the at least one IMU.

9. The method of claim 8, wherein adjusting the torque of the vehicle to mitigate the powerhop includes considering a wheel slip limit.

10. A vehicle, comprising:

a plurality of sensors each configured to generate sensor data, wherein the plurality of sensors includes at least one wheel speed sensor and at least one ride height sensor;

a controller in communication with the plurality of sensors, wherein the controller is programmed to:

receive sensor data from the plurality of sensors, where the sensor data includes wheel speed;

determine a wheel jerk characteristics of the vehicle based on the wheel speed;

determine the ride height of the vehicle using the sensor data;

determine whether the vehicle is experiencing power-hop based on the wheel jerk characteristics and the ride height of the vehicle; and in response to determining that the vehicle is experiencing powerhop, adjust a torque of the vehicle to mitigate the powerhop, wherein the wheel jerk characteristics include a wheel jerk amplitude and a wheel jerk duration, wherein the wheel jerk amplitude is a second derivate of the wheel speed with respect to time.

11. The vehicle of claim 10, wherein the controller is programmed to:

determine whether an absolute value of a change in the wheel jerk amplitude within a predetermined amount of time is greater than a predetermined amplitude threshold; and in response to determining that the absolute value of the change in the wheel jerk amplitude within the predetermined amount of time is greater than the predetermined amplitude threshold, set a wheel speed flag to on.

12. The vehicle of claim 11, wherein the controller is programmed to:

determine whether a change in the ride height of the vehicle within the predetermined amount of time is less than a predetermined ride height threshold; and in response to determining that the change in the ride height of the vehicle within the predetermined amount of time is less than the predetermined ride height threshold, set a ride height flag to on.

13. The vehicle of claim 12, wherein the controller is programmed to:

determine whether an Anti-lock Braking System (ABS) of the vehicle is inactive.

14. The vehicle of claim 13, wherein the controller is programmed to determine whether a derivative of a throttle position with respect to time is equal or greater than zero.

15. The vehicle of claim 14, wherein the controller is programmed to:

determine that the ABS of the vehicle is inactive;

determine that the derivative of the throttle position with respect to time is equal or greater than zero;

determine that the wheel speed flag is set to on;

determine that the ride height flag is set to on;

setting a powerhop flag to on in response to: (a) determining that the ABS of the vehicle is inactive; (b) determining that the derivative of the throttle position with respect to time is equal or greater than zero; (c) determining that the wheel speed flag is set to on; and (d) determining that the ride height flag is set to on.

16. The vehicle of claim 15, wherein the torque of the vehicle is adjusted to mitigate the powerhop in response to setting the powerhop flag to on.

17. The vehicle of claim 16, wherein the plurality of sensors includes at least one inertial measurement unit (IMU), the wheel speed is determined using the at least one wheel speed sensor of the vehicle, and the ride height is determined using the at least one ride height sensor of the vehicle, and the controller is programmed to:

determine that the at least one wheel speed sensor is unavailable;

determine that the least one ride height sensor is unavailable; and in response to determining that the at least one wheel speed sensor is unavailable and determining that the least one ride height sensor is unavailable, use a machine learning process to determine that the vehicle is experiencing powerhop using sensor data from the at least one IMU.

18. The vehicle of claim 17, wherein adjusting the torque of the vehicle to mitigate the powerhop includes considering a wheel slip limit.

\*    \*    \*    \*    \*